US012593861B2

(12) United States Patent
Du et al.

(10) Patent No.: US 12,593,861 B2
(45) Date of Patent: Apr. 7, 2026

(54) SYRUP BINDER SYSTEM FOR PREPARING FOOD, AND PREPARATION PROCESS AND USE THEREOF

(71) Applicant: SOCIETE DES PRODUITS NESTLE S.A., Vevey (CH)

(72) Inventors: Xiaona Du, Shenzhen (CN); Zonghui Guo, Tianjin (CN); Marion Branchy, York (GB); Jingqin Wang, Dongguan (CN)

(73) Assignee: Societe des Produits Nestle S.A., Vevey (CH)

( * ) Notice: Subject to any disclaimer, the term of this patent is extended or adjusted under 35 U.S.C. 154(b) by 403 days.

(21) Appl. No.: 17/425,900

(22) PCT Filed: Jan. 29, 2020

(86) PCT No.: PCT/EP2020/052110
§ 371 (c)(1),
(2) Date: Jul. 26, 2021

(87) PCT Pub. No.: WO2020/157102
PCT Pub. Date: Aug. 6, 2020

(65) Prior Publication Data
US 2022/0192244 A1 Jun. 23, 2022

(30) Foreign Application Priority Data
Feb. 1, 2019 (CN) .......................... 201910104808.7

(51) Int. Cl.
*A23L 29/30* (2016.01)
*A23G 3/34* (2006.01)
(Continued)

(52) U.S. Cl.
CPC ................ *A23L 29/37* (2016.08); *A23G 3/34* (2013.01); *A23L 7/126* (2016.08); *A23L 29/10* (2016.08); *A23L 29/262* (2016.08)

(58) Field of Classification Search
CPC ........ A23L 29/37; A23L 7/126; A23L 29/262; A23L 25/25; A23L 29/30; A23G 3/34; A23G 3/343
See application file for complete search history.

(56) References Cited

U.S. PATENT DOCUMENTS

2005/0002989 A1 1/2005 Palmer et al.
2005/0181019 A1 8/2005 Palmer et al.
(Continued)

FOREIGN PATENT DOCUMENTS

CN 101185457 5/2008
CN 105325879 2/2016
(Continued)

OTHER PUBLICATIONS

Stephen A and Cummings JH, "Water-holding by dietary fibre in vitro and its relationship to faecal output in man," Gut, 1979, 20, 722-729 (Year: 1979).*
(Continued)

*Primary Examiner* — Jenna A Watts
(74) *Attorney, Agent, or Firm* — K&L Gates LLP

(57) ABSTRACT
The present invention relates to the food field. Specifically, the present invention relates to a syrup binder system for preparing a food containing extruded or puffed cereal and/or nuts, such as compound sachima (complexed sachima), cereal bars, crunchy rice candy or nut bars, etc., a preparation process and use thereof, and a food containing the syrup binder system.

13 Claims, 1 Drawing Sheet

(51) Int. Cl.
| | |
|---|---|
| *A23L 7/126* | (2016.01) |
| *A23L 29/10* | (2016.01) |
| *A23L 29/262* | (2016.01) |

(56) References Cited

U.S. PATENT DOCUMENTS

| | | | |
|---|---|---|---|
| 2007/0014914 A1 | 1/2007 | Borders et al. | |
| 2009/0017168 A1 | 1/2009 | Treece et al. | |
| 2011/0104356 A1* | 5/2011 | Coleman | A23G 3/54 |
| | | | 426/573 |
| 2012/0269939 A1 | 10/2012 | Hahn et al. | |
| 2014/0154363 A1 | 6/2014 | Duffy et al. | |
| 2016/0309752 A1* | 10/2016 | Lamikanra | A23L 33/40 |

FOREIGN PATENT DOCUMENTS

| | | |
|---|---|---|
| EP | 1844665 | 10/2007 |
| EP | 2316277 | 5/2011 |
| WO | 0164044 | 9/2001 |
| WO | 2011019690 | 2/2011 |
| WO | 2014158777 | 10/2014 |
| WO | 2017078519 | 5/2017 |

OTHER PUBLICATIONS

"Cellulose Gum—Sources of Food Ingredients," International Food Additives Council, Jan. 18, 2015, retrieved from the Internet Oct. 17, 2023, <https://www.foodingredientfacts.org/facts-on-food-ingredients/sources-of-food-ingredients/cellullose-gum/> (Year: 2015).*

Sarab Sahi, "Viscosity measurements in food products and manufacturing," New Food, Oct. 27, 2014 (Year: 2014).*

"Oligofructose and Fructooligosaccharides (FOS): Derived Mostly from Chicory Root or Cane Sugar," The VRG Blog Editor, The Vegetarian Resource Group Blog, Oct. 22, 2012 (Year: 2012).*

Huang et al., "Effects of Wheat Fiber, Oat Fiber, and Inulin on Sensory and Physico-Chemical Properties of Chinesestyle Sausages", Asian-Australasian Journal of Animal Sciences, vol. 24, Issue No. 6, 2011, pp. 875-880.

Negi et al., "Functional Properties of Apple Pomace Powder", International Journal of Current Microbiology and Applied Sciences, vol. 8, Issue No. 03, 2019, pp. 589-595.

Adetoro et al., "Effect of Carrier Agents on the Physicochemical and Technofunctional Properties and Antioxidant Capacity of Freeze-Dried Pomegranate Juice (*Punica granatum*) Powder", Foods, vol. 9, Issue No. 10, 2020, pp. 1-20.

Torres et al., "Effect of the Addition of Soluble Dietary Fiber and Green Tea Polyphenols on Acrylamide Formation and In Vitro Starch Digestibility in Baked Starchy Matrices", Molecules, vol. 24, Issue No. 20, 2019, pp. 1-18.

Boulos et al., "Water Holding Capacity of Selected Soluble and Insoluble Dietary Fibre", International Journal of Food Properties, vol. 3, Issue No. 2, 2000, pp. 217-231.

European Office Action for European Patent Application No. 20704422.3 dated Mar. 14, 2022.

Pan et al., "Introduction to Natural Medicine", 1st Edition, Apr. 30, 2018, p. 187.

Gibson et al., "Functional Foods", 1st Edition, Feb. 28, 2005, pp. 232-233.

Office Action Received for Application No. CN201910104808.7, mailed on Apr. 13, 2024, 17 Pages(9 Pages of English Translation and 8 Pages of Official Copy).

Mora et al., "Chemical Composition and Functional Properties From Different Sources of Dietary Fiber", American Journal of Food and Nutrition, 2013, vol. 1, Issue No. 3, pp. 27-33.

Mexico Office Action for Appl No. MX/a/2021/008859 dated Jun. 10, 2025, 7 pages.

* cited by examiner

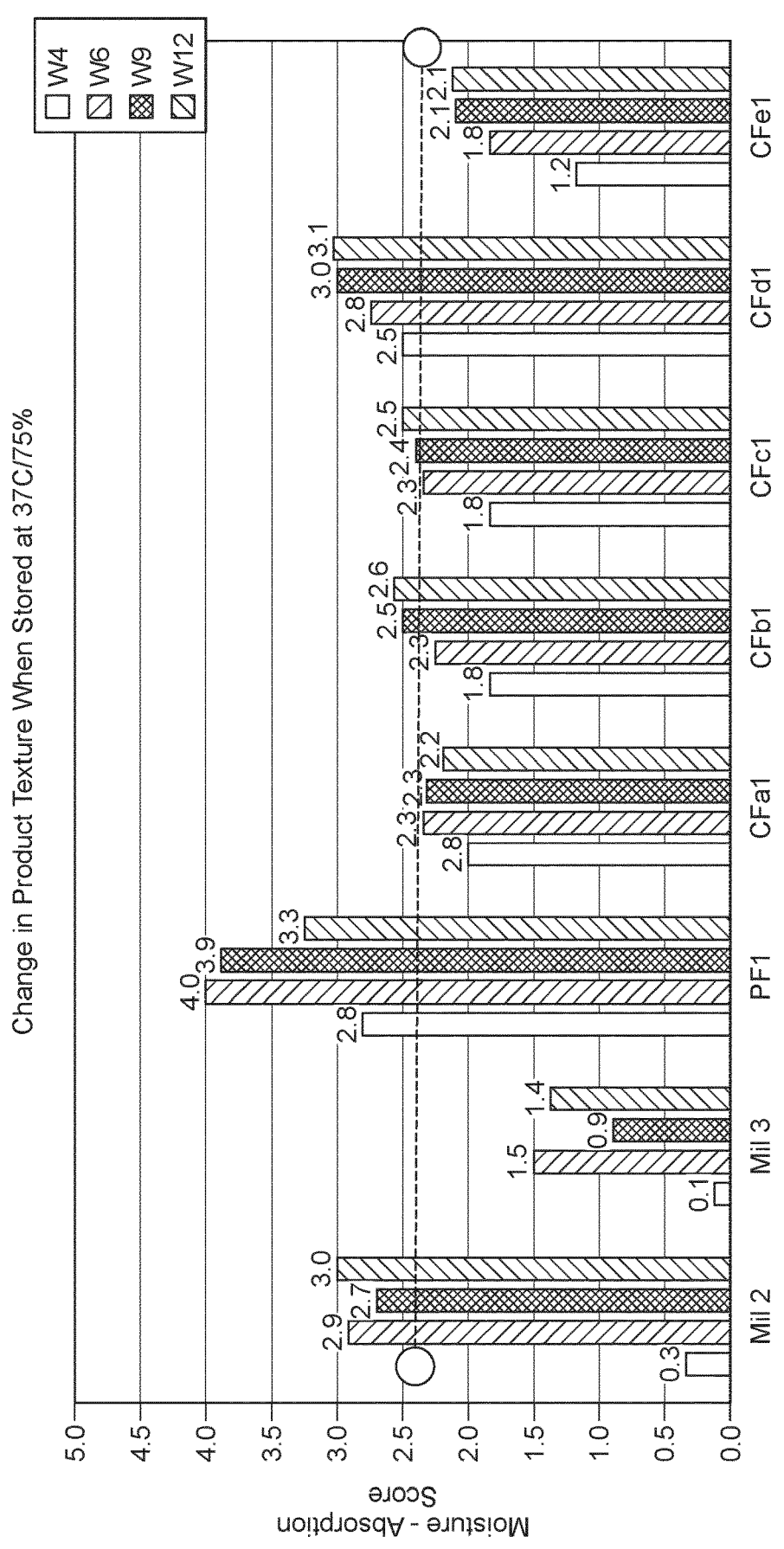

SYRUP BINDER SYSTEM FOR PREPARING FOOD, AND PREPARATION PROCESS AND USE THEREOF

CROSS REFERENCE TO RELATED APPLICATIONS

The present application is a National Stage of International Application No. PCT/EP2020/052110, filed on Jan. 29, 2020. which claims priority to Chinese Patent Application No. 201910104808.7, filed on Feb. 1, 2019, the entire contents of which are being incorporated herein by reference.

FIELD OF THE INVENTION

The present invention relates to the food field. Specifically, the present invention relates to a syrup binder system for preparing a food containing extruded or puffed cereal and/or nuts, such as compound sachima (complexed sachima), cereal bars, crunchy rice candy or nut bars, etc., a preparation process and use thereof, and a food containing the syrup binder system.

BACKGROUND OF THE INVENTION

Sachima is a traditional Chinese snack, generally prepared by using syrup to bind together deep-fried noodles. To increase the diversity of choice for consumers, the present invention desires to provide a compound sachima containing not only deep-fried noodles but also extruded or puffed cereal and/or nuts.

However, the inventors have found that when a traditional syrup is used to prepare such a compound sachima, the product obtained exhibits a dampened texture and taste after less than one week, and has a shorter shelf-life than traditional sachima.

The Chinese patent application CN101185457A has disclosed a non-deep-fried sachima food. It ensures that the sachima produced contains no trans-fats or carcinogens by using puffing instead of deep-frying, and shortens the production process.

The Chinese patent application CN101919480A has disclosed a baked sachima, and a method of producing same. It uses the method of baking ready-made noodles instead of the traditional deep-frying method, thereby avoiding the problems of the destruction of the food's own nutritional elements and the production of carcinogens which occur when food is deep-fried at a high temperature.

The Chinese patent application CN102960631A has disclosed a method for preparing a non-deep-fried sachima using a twin-screw extrusion method. It uses an extrusion/puffing technique instead of deep-frying, to avoid the shortcomings of deep-fried sachima.

It can be seen that all of the patent applications mentioned above make efforts to avoid shortcomings caused by the deep-frying process, such as the destruction of nutriments and the production of carcinogens; moreover, the syrup used in each case is a traditional syrup. Not one of the above-mentioned patent applications mentions or teaches a compound sachima containing extruded or puffed cereal and/or nuts, much less mentions or teaches the shortcomings of such a compound sachima in terms of a dampened texture and taste, and a shortened shelf-life, and there is also no mention or teaching of how to solve these shortcomings.

Thus, a new syrup binder system is needed, which is capable of ensuring a suitable shelf-life (e.g. 9-10 months)

and preventing the product obtained from exhibiting a dampened texture and taste during the shelf-life.

CONTENT OF THE INVENTION

Brief Description of the Invention

The inventor has unexpectedly discovered that: a syrup binder system of the present invention, containing a sugar, a polyol, dietary fiber having a water holding capacity (WHC) greater than 8 ml/g such as citric fiber, an emulsifier, edible oil and water, can ensure that a product has a suitable shelf-life (e.g. 9-10 months) and maintain product texture and taste during the shelf-life. After much research, the inventor has unexpectedly discovered that this is mainly achieved by reducing or preventing the migration of moisture between the syrup binder system and a bound foodstuff such as extruded or puffed cereal and/or nuts.

Even more unexpectedly, the inventor has also found that when the syrup binder system of the present invention further contains cellulose or a derivative thereof such as carboxymethylcellulose or a derivative thereof, a better effect is obtained in terms of shelf-life and texture and taste during shelf-life.

Moreover, the inventor has also found that the syrup binder system of the present invention, when used for other foods containing extruded and/or puffed cereal and/or nuts such as cereal bars, crunchy rice candy or nut bars etc., can similarly give produce the good effect mentioned above.

Thus, in a first aspect, a syrup binder system for food is provided, which binder system comprises a sugar, a polyol, dietary fiber having water holding capacity (WHC) greater than 8 ml/g such as citric fiber, an emulsifier, edible oil, and water.

In another embodiment, the syrup binder system of the present invention further comprises cellulose or a derivative thereof, e.g., cellulose ether, cellulose ester, or cellulose ether ester, preferably cellulose ether, e.g., carboxymethylcellulose (CMC) or a derivative thereof, e.g., a salt, such as sodium carboxymethylcellulose or calcium carboxymethylcellulose.

In another embodiment, the syrup binder system of the present invention may further comprise one or more of any other substances that may be added into the syrup binder system, e.g., one or more of flavouring substances (e.g. malt extract, chocolate flavouring or essence), pigments, edible salts, preservatives, antioxidants, vitamins, minerals, trace elements and nutriments.

In another embodiment, the syrup binder system of the present invention has a water activity ranging from 0.3 to 0.7, preferably from 0.4 to 0.6.

In another embodiment, the syrup binder system of the present invention has a viscosity of 1050-1550 CP at about 85° C. (e.g. determined using a Brookfield viscometer LV03 probe).

In a second aspect, a process for preparing the syrup binder system of the present invention is provided, comprising:

(a) providing a syrup mixture having a Brix value of about 80%-90%, preferably about 82%-88%, and more preferably about 84-87%, wherein the syrup mixture comprises an emulsifier;

(b) adding a polyol into the syrup mixture of step (a) and mixing till even;

(c) adding an edible oil into the syrup mixture from step (b) at 100-120° C. and mixing till even, yielding the syrup binder system;

wherein dietary fiber having water holding capacity greater than 8 ml/g, preferably of 8-15 mg/g, and more preferably of 9-14 mg/g is included in the syrup mixture of step (a), or alternatively, is added alone or in the form of a premixture with the polyol in step (b).

In a third aspect, a syrup binder system obtained or obtainable by the preparation process of the present invention is provided.

In a fourth aspect, provided is the use of the syrup binder system of the present invention for the manufacture of a food comprising extruded or puffed cereal and/or nuts, such as compound sachima, a cereal bar, crunchy rice candy or a nut bar.

In a fifth aspect, provided is a food, such as compound sachima, a cereal bar, crunchy rice candy or a nut bar, comprising the syrup binder system of the present invention and extruded or puffed cereal and/or nuts.

DETAILED DESCRIPTION OF THE INVENTION

It can be understood that "a", "the" or an entity itself as used herein includes the singular and plural forms thereof, unless otherwise indicated. Moreover, the terms "include", "contain", "comprise" and similar terms as used herein should be understood to mean that a substance which is not specifically identified may also be included, in addition to the substance identified.

The sugar usable in the present invention may come from any suitable source known to those skilled in the art. For example, in one embodiment, the sugar comes from syrup (e.g. glucose syrup, maltitol syrup, sorbitol syrup, high-fructose corn syrup, invert syrup, etc. or any combination thereof), edible sugar (e.g. white sugar, rock sugar, brown sugar or dark brown sugar, light brown sugar, etc.), powdered sugar, monosaccharides or oligosaccharides (e.g. glucose, fructose, sucrose, maltose, etc. or any combination thereof), sugar alcohols (e.g. xylitol, lactitol, maltitol, sorbitol, etc. or any combination thereof) or any combination of these. Preferably, the sugar comes from glucose syrup, maltitol syrup, sorbitol syrup, high-fructose corn syrup, invert syrup, powdered sugar or any combination of these. More preferably, the sugar comes from a combination of powdered sugar and a mixed syrup (e.g. containing 50-60% glucose syrup, 10-20% maltitol syrup, 1-5% sorbitol syrup and 20-30% high-fructose corn syrup, or composed of these).

The "glucose syrup" as used herein is a starch syrup produced under the action of an enzyme or an acid using starch as a starting material, and has as main components glucose, maltose, maltotriose, maltotetraose and tetrasaccharides and above, etc. Glucose syrup has moderate sweetness and viscosity, is used widely in the food field, and can be purchased easily. Preferably, the glucose syrup usable in the present invention is glucose syrup with a solids content of 80%.

The "maltitol syrup" as used herein is a solution of maltitol in water, and preferably contains 70-80%, more preferably 75-80%, most preferably 79-80% maltitol. It is well known to those skilled in the art, and can be purchased easily.

The "sorbitol syrup" as used herein is a solution of sorbitol in water, and preferably contains 70-80%, more preferably 75-80%, most preferably 79-80% sorbitol. It is well known to those skilled in the art, and can be purchased easily.

The "high-fructose corn syrup" (HFCS) as used herein is a mixture obtained by using glucose isomerase to process corn starch, and mainly contains fructose and glucose and a small amount of unprocessed glucose oligomer. Preferably, The high-fructose corn syrup usable in the present invention is high-fructose corn syrup with a solids content of 79-80%. It is well known to those skilled in the art, and can be purchased easily.

The "powdered sugar" as used herein is a sugar powder made by grinding edible sugar into powdered form. It may be made by oneself, or purchased easily.

The "dietary fiber with a water holding capacity (WHC) greater than 8 ml/g" may come from any suitable source; preferably, the dietary fiber with a water holding capacity (WHC) greater than 8 ml/g in the present invention is dietary fiber with a water holding capacity (WHC) of 8-15 ml/g, preferably 9-14 ml/g. For example, the dietary fiber may be selected from one or more of citric fiber, soybean fiber, potato fiber and wax gourd fiber, and is preferably citric fiber. The dietary fiber of the present invention may be dispersed in liquid oil. Preferably, the dietary fiber with a water holding capacity (WHC) greater than 8 ml/g in the present invention is present in an amount of 0.1-8 wt %, more preferably 0.2-6 wt %, most preferably 0.5-5%, based on the total weight of the syrup binder system.

The term "water holding capacity" (WHC) is the ability of a substance to physically retain water and prevent water from seeping out. It may be determined by a conventional method known in the art, e.g. dissolving a starting material in water, and weighing an increase in weight of a remaining substance after centrifugal dehydration, to determine the water holding capacity.

The "citric fiber" (citric fibers, CF) as used herein is a dietary fiber component obtained from any part of citrus fruit. A feature of citrus fruit is that a flesh part, having a large number of pockets filled with juice, is enclosed by a tough skin, including mandarin orange, tangerine, orange, pomelo, etc. Real examples thereof include but are not limited to orange, sweet orange, kumquat, lime, lemon, citron, pomelo, grapefruit, etc. Any part of the citrus fruit may be used to prepare citric fiber, e.g. including but not limited to the skin, pulp, flesh, juice or any combination of these. It may be obtained by a method known in the art, e.g. the method described in WO94/27451, WO2006/033697 or WO2012/016190. Alternatively, the citric fiber used in accordance with the present invention may also be purchased easily. Moreover, the citric fiber used in accordance with the present invention includes unmodified or modified citric fiber, wherein the modification is for example esterification, derivatization, substitution, enzyme modification, etc. Preferably, the citric fiber (including modified and/or unmodified citric fiber) is present in an amount of 0.1-8 wt %, more preferably 0.2-6 wt %, most preferably 0.5-5 wt % based on the total weight of the syrup binder system.

The emulsifier used in accordance with the present invention is any edible emulsifier known in the art which can be used in an oil-in-water system, and for example is selected from: monoglycerides or diglycerides; acetylated monoglycerides or diglycerides; succinylated monoglycerides or diglycerides; lecithin; propylene glycol monoesters or diesters of fatty acids; polyglycerol fatty acid esters; polysorbates; sucrose fatty acid esters; or any combination of these. Preferably, the emulsifier is present in an amount of 0.01-5 wt %, more preferably 0.05-3 wt %, most preferably 0.1-1.5 wt % based on the total weight of the syrup binder system.

The edible oil used in accordance with the present invention is any oil usable for consumption that is known to those skilled in the art, e.g. animal fat, vegetable oil or any combination of these. The animal fat is for example lard, beef tallow, mutton tallow, fish oil, etc. The vegetable oil is for example corn oil, salad oil, bean oil, peanut oil, sunflower oil, rapeseed oil, canola oil, sesame oil, coconut oil, palm oil, olive oil, walnut oil, etc. Preferably, the edible oil is corn oil, palm oil or salad oil. Further preferably, the edible oil is present in an amount of 1-25 wt %, more preferably 5-22 wt %, most preferably 8-15 wt % based on the total weight of the syrup binder system.

The polyol usable in the present invention is preferably a polyol having 2-5 hydroxyl groups, e.g. a polyol having 2-5 hydroxyl groups and 3-5 carbon atoms, e.g. diols such as propylene glycol, triols such as glycerol (glycerine), etc. Preferably, the polyol is present in an amount of 1-25 wt %, preferably 5-20 wt %, more preferably 6-15 wt % based on the total weight of the syrup binder system.

In a further embodiment, the syrup binder system may further contain cellulose or a derivative thereof such as a cellulose ether, cellulose ester or cellulose ether ester, preferably a cellulose ether, e.g. carboxymethylcellulose (CMC) or a derivative thereof such as a salt. The carboxymethylcellulose or derivative thereof used in accordance with the present invention may be selected from carboxymethylcellulose or a sodium salt or calcium salt thereof, and can be purchased easily. If present, the cellulose or derivative thereof is present in an amount of 0.002-2 wt %, preferably 0.005-1.5 wt %, more preferably 0.01-1 wt % based on the total weight of the syrup binder.

In a further embodiment, the syrup binder system may further contain one or more any other substance capable of being added to the syrup binder system, e.g. one or more of a flavouring substance (e.g. malt extract, chocolate flavouring, cheese flavouring, seaweed flavouring, milk flavouring, curry flavouring, satay flavouring, chilli flavouring, peanut flavouring, adzuki bean flavouring, fruit flavouring, essence such as orange essence, strawberry essence, etc.), pigment, edible salt, preservative (e.g. benzoic acid and salts thereof, sorbic acid and salts thereof, parabens, etc.), antioxidant (e.g. butylated hydroxyanisole, dibutylhydroxytoluene, etc.), vitamin, mineral, trace element, nutriment, etc. These are well known to those skilled in the art, and the specific types and usage amounts thereof may be determined easily by those skilled in the art. In one embodiment, the flavouring of the present invention is a malt extract or chocolate flavouring. Preferably, the flavouring substance is present in an amount of 0.5-8 wt %, more preferably 1-5 wt %, most preferably 2-3 wt % based on the total weight of the syrup binder system.

The syrup binder system of the present invention has a water activity of 0.3 to 0.7, preferably 0.4-0.6. The term "water activity" (Aw) is used to indicate the state in which water is present in the system, i.e. the degree of binding or degree of freeness of water, and is a value in the range of 0-1. Methods of determining the water activity are known in the art, e.g. determination by a diffusion method or by means of a water activity tester.

The syrup binder system of the present invention has a viscosity of 1050-1550 CP at about 85° C. Methods of determining viscosity are known in the art, e.g. determination using a Brookfield viscometer LV03 probe.

The present invention also provides a process for preparing the syrup binder system of the present invention, the process comprising:

(a) providing a syrup mixture having a Brix value of about 80%-90%, preferably about 82%-88%, more preferably about 84-87%, the syrup mixture containing an emulsifier;

(b) adding a polyol to the syrup mixture of step (a) and mixing until uniform;

(c) adding an edible oil to the syrup mixture from step (b), which is at 100-120° C., and mixing until uniform, to obtain a syrup binder system, wherein dietary fiber with a water holding capacity greater than 8 ml/g, preferably with a water holding capacity of 8-15 ml/g, more preferably 9-14 ml/g is contained in the syrup mixture of step (a), or is added alone or as a premixture with the polyol in step (b).

In one embodiment, in step (a), the expected Brix value may be obtained by (a1) boiling an aqueous solution of sugar and/or (a2) mixing sugar in dry form e.g. in the form of a dry powder with water or an aqueous solution of sugar or both and, taking circumstances into consideration, boiling. In one embodiment, the aqueous solution of sugar is in the form of a syrup. Preferably, the syrup is selected from glucose syrup, maltitol syrup, sorbitol syrup, high-fructose corn syrup, invert syrup or any combination of these. More preferably, the syrup is a mixture of glucose syrup, maltitol syrup, sorbitol syrup and high-fructose corn syrup. More preferably, the syrup contains 50-60% glucose syrup, 10-20% maltitol syrup, 1-5% sorbitol syrup and 20-30% high-fructose corn syrup, or is composed of these. In another embodiment, the sugar in dry form may be edible sugar (e.g. white sugar, rock sugar, brown sugar or dark brown sugar, light brown sugar, etc.), powdered sugar, monosaccharides or oligosaccharides (e.g. glucose, fructose, sucrose, maltose, etc.), sugar alcohols (e.g. xylitol, lactitol, maltitol, sorbitol, etc.) or any combination of these.

In a further embodiment, the boiling is carried out using a method known in the art. For example, the boiling is carried out at about 110 to 120° C., e.g. at about 110° C. The boiling time is a time sufficient to obtain the expected Brix value, e.g. may be 30-90 minutes, preferably 50-60 minutes.

"Brix" as used herein is used to indicate the content of soluble solids in a product. Methods of determining the Brix value are known in the art, e.g. determination may be performed by means of a Brix meter such as an Atago Brix meter.

In one embodiment, in step (a), the emulsifier and, if present, the dietary fiber may, independently of each other, be added alone or in the form of a premixture (e.g. a premixture with powdered sugar or a premixture with glycerol or water). Alternatively, the dietary fiber may be added alone or as a premixture with the polyol in step (b).

In one embodiment, the "syrup mixture" in step (a) may further contain cellulose or a derivative thereof such as a cellulose ether, cellulose ester or cellulose ether ester, preferably a cellulose ether, e.g. carboxymethylcellulose or a derivative thereof such as a salt (e.g. sodium carboxymethylcellulose or calcium carboxymethylcellulose); these may be added alone or in the form of a premixture (e.g. a premixture with powdered sugar or a premixture with glycerol or water) in step (a). Alternatively, the cellulose or derivative thereof may be added alone or as a premixture with the polyol in step (b).

In one embodiment, the "syrup mixture" in step (a) may further contain one or more any other substance capable of being added to the syrup binder system, e.g. one or more of a flavouring substance (e.g. malt extract, chocolate flavouring, cheese flavouring, seaweed flavouring, milk flavouring, curry flavouring, satay flavouring, chilli flavouring, peanut flavouring, adzuki bean flavouring, fruit flavouring, essence such as orange essence, strawberry essence, etc.), pigment, edible salt, preservative (e.g. benzoic acid and salts thereof, sorbic acid and salts thereof, parabens, etc.), antioxidant (e.g. butylated hydroxyanisole, dibutylhydroxytoluene, etc.), vitamin, mineral, trace element and nutriment, etc.; these may be added alone or in the form of a premixture (e.g. a premixture with powdered sugar or a premixture with glycerol or water) in step (a). Alternatively, they may be added alone or as a premixture with the polyol in step (b).

The food of the present invention contains the syrup binder system of the present invention, and a bound foodstuff. The "bound foodstuffs" as used herein are any foodstuffs capable of being bound together using the syrup binder system. They may be prepared using any suitable starting material (e.g. flour such as wheat flour, cereal flour or miscellaneous grain flour, rice flour, sweet potato flour, etc.) by any method known in the art (e.g. deep-frying, extrusion such as twin-screw extrusion, puffing, etc.), and may be in any suitable shape, e.g. strips, particles, small lumps, etc. Preferably, the bound foodstuff of the present invention contains deep-fried noodles, extruded or puffed cereal, nuts or any combination of these. More preferably, the bound foodstuff of the present invention contains a combination of deep-fried noodles and extruded or puffed cereal and/or nuts. Further preferably, the bound foodstuff of the present invention may further contain any other substance capable of being added, e.g. dry fruit kernels, raisins, dried cranberries, sesame, etc. It will be understood that although the syrup binder systems of the present invention have been designed to be used for a food containing extruded or puffed cereal and/or nuts or any combination of these, they may also be used to prepare traditional sachima and similar foods. Such foods are similarly included in the scope of the present invention.

Preferably, the food of the present invention contains 40-60 wt %, preferably 45-65 wt %, more preferably 48-62 wt %, most preferably 50-52 wt % of a bound foodstuff, and 40-60 wt %, preferably 35-55 wt %, more preferably 38-52 wt %, most preferably 48-50 wt % of a syrup binder system.

Methods of preparing the food of the present invention are known in the art, e.g. prepared by adding the bound foodstuff to the syrup binder system of the present invention, shaping by pressing, and cutting. Preferably, the food of the present invention is a compound sachima, cereal bar, crunchy rice candy or nut bar. The term "compound sachima" as used herein is a sachima containing deep-fried noodles and extruded or puffed cereal and/or nuts as a bound foodstuff. Optionally, the food of the present invention may also be coated, e.g. chocolate-coated. Coating formulas and methods are well known in the art.

The term "about" as used herein means varying within a range of ±10%, preferably ±5% of the given value.

The term "wt %" as used herein means weight percent. Unless otherwise stated, percentages as used herein also means weight percentages.

DESCRIPTION OF THE ACCOMPANYING FIGURE

FIG. 1 shows scoring of texture properties of 8 types of sachima prepared in example 6, which are stored for 4, 6, 9 and 12 weeks respectively at 37° C. and 75% relative humidity. For each formula, the 4 bars sequentially correspond to 4 weeks (W4), 6 weeks (W6), 9 weeks (W9) and 12 weeks (W12) from left to right.

PARTICULAR EMBODIMENTS

The present invention is expounded further with reference to the examples below. However, these examples are merely intended to explain and illustrate the present invention, and do not in any way limit the scope thereof.

Example 1: Preparation of Syrup Binder System of the Present Invention 47 kg of a mixed syrup (containing 79.5% glucose syrup, 20% maltitol syrup and 0.5% sorbitol syrup), 15 kg of high-fructose corn syrup, 0.4 kg of edible salt, and a sucrose fatty acid premixture (obtained by adding 0.15 kg of sucrose fatty acid ester to 3 kg of water at room temperature and stirring) are mixed and boiled, until a syrup mixture of 84-85% Brix (ATAGO Brix meter, measured at room temperature according to the manufacturer's instructions) is obtained.

Furthermore, 0.85 kg of citric fiber (Fi100, Fiberstar) is added to 10 kg of glycerol at room temperature and stirred, to obtain a citric fiber premixture, which is then added to the abovementioned syrup mixture.

22 kg of corn oil is then added and stirring is carried out at 100° C. until the oil phase is uniformly dispersed in the syrup mixture, to obtain an expected syrup binder system, which is stored at 80-90° C. ready for use.

Example 2: Preparation of Syrup Binder System of the Present Invention 100 kg of a mixed syrup (containing 79.5% glucose syrup, 20% maltitol syrup and 0.5% sorbitol syrup), 5 kg of high-fructose corn syrup, 20 kg of powdered sugar, 0.02 kg of carboxymethylcellulose, 0.6 kg of malt extract, 0.6 kg of edible salt, and a sucrose fatty acid premixture (obtained by adding 0.15 kg of sucrose fatty acid ester to 5 kg of water at room temperature and stirring) are mixed and boiled, until a syrup mixture of 86-87% Brix (ATAGO Brix meter) is obtained.

Furthermore, 0.6 kg of citric fiber (Fi200, Fiberstar) is added to 8 kg of glycerol at room temperature and stirred, to obtain a citric fiber premixture. The citric fiber premixture and 0.3 kg of chocolate flavouring are added to the abovementioned syrup mixture, and stirred in until uniformity is achieved.

8.0 kg of palm oil is then added and stirring is carried out at 100° C. until the oil phase is uniformly dispersed in the syrup mixture, to obtain an expected syrup binder system, which is stored at 80-90° C. ready for use.

Example 3: Preparation of Syrup Binder System of the Present Invention 100 kg of a mixed syrup (containing 79.5% glucose syrup, 20% maltitol syrup and 0.5% sorbitol syrup), 5 kg of high-fructose corn syrup, 20 kg of powdered sugar, 0.02 kg of carboxymethylcellulose, 0.6 kg of malt extract, 0.6 kg of edible salt, a sucrose fatty acid premixture (obtained by adding 0.33 kg of sucrose fatty acid ester (P-1570) to 5 kg of water at room temperature and stirring) and a citric fiber premixture (obtained by adding 0.6 kg of citric fiber (Fi200, Fiberstar) to 24.6 kg of water at room temperature and stirring) are mixed and boiled, until a syrup mixture of 86-87% Brix (ATAGO Brix meter) is obtained.

8 kg of glycerol and 0.3 kg of chocolate flavouring are then added, and stirred in until uniformity is achieved.

8.0 kg of palm oil is then added and stirring is carried out at 100° C. until the oil phase is uniformly dispersed in the syrup mixture, to obtain an expected syrup binder system, which is stored at 80-90° C. ready for use.

Example 4: Preparation of Syrup Binder System of the Present Invention

The syrup binder system of example 4 is obtained by a method similar to that used in example 3, except that citric fiber is mixed with an equal amount of powdered sugar to prepare a citric fiber premixture.

Example 5: Preparation of Compound Sachima of the Present Invention 5.1 Preparation of Deep-Fried Noodles Deep-fried noodles of sachima are prepared by a method identical to a conventional operation in the art. The formula of the dough is as shown in the table below:

| Component | Amount (kg) | Proportion (wt %) |
|---|---|---|
| Strong flour | 100 | 62.11 |
| Liquid egg | 60 | 37.27 |
| Baking soda | 0.6 | 0.37 |
| Ammonium bicarbonate | 0.4 | 0.25 |

Specifically, the abovementioned components are fully mixed to form the dough. The dough is pressed into a sheet, then rises for 30-120 minutes at 28-32° C. The dough which has undergone the first rising is pressed into a sheet again and cut into strips, then rises for 60-180 minutes at 28-32° C. The risen uncooked noodles are deep-fried for 80-100 seconds in oil at 165-180° C., to obtain the deep-fried noodles.

5.2 Preparation of Extruded Cereal Particles

Extruded cereal particles are prepared by a method identical to a conventional operation in the art. Specifically, wheat flour, rice flour, sodium bicarbonate and table salt are pre-mixed uniformly, and delivered to a twin-screw puffing extruder at the rate of 150-250 kg per hour; the puffing temperature is 150-170° C. After puffing extrusion, the extruded cereal particles have a moisture content after drying of 2-4% (using a Mettler fast moisture content testing method, with drying at 105° C.). The formula of the extruded cereal is as shown in the table below:

| Component | Amount (kg) | Proportion (%) |
|---|---|---|
| Rice flour | 80.0 | 79.2 |
| Wheat flour | 20.0 | 19.8 |
| Table salt | 0.5 | 0.5 |
| Sodium bicarbonate | 0.5 | 0.5 |
| Total | 101.0 | 100.0 |

5.3 Preparation of Compound Sachima 60 kg of the abovementioned deep-fried noodles together with 40 kg of the abovementioned extruded cereal particles are mixed uniformly with the syrup binder system (100 kg)

of example 2, which is at 80-90° C. After cooling, the mixture obtained is shaped by pressing, and cut into pieces, to obtain the compound sachima.

Furthermore, the abovementioned sachima is coated with chocolate, then cooled, to obtain a compound sachima with a chocolate coating.

Example 6: Evaluation of Compound Sachima

A syrup binder system is prepared in a manner similar to example 1, except that the following variable quantities are used, and no chocolate flavouring is added:

Formula Mil2: 0.85 kg of starch (used to balance formula standard amount, likewise below) replaces 0.85 kg of citric fiber, 18 kg of mixed syrup replaces 17 kg of corn oil, and the syrup mixture is 80% Brix;

Formula Mil3: 0.85 kg of starch replaces 0.85 kg of citric fiber, 18 kg of mixed syrup replaces 17 kg of corn oil;

Formula PF1: 1.25 kg of polydextrose replaces 0.85 kg of citric fiber;

Formula CFa1: the same as example 1, i.e. 0.85 kg of citric fiber is still used;

Formula CFb1: 0.85 kg of citric fiber is still used, and 3 kg of mixed syrup and 2 kg of glycerol replace 5 kg of corn oil;

Formula CFc1: 0.85 kg of citric fiber is still used, and 1 kg of starch replaces 1 kg of high-fructose corn syrup;

Formula CFd1: 0.01 kg of CMC replaces 0.85 kg of citric fiber;

Formula CF31: 0.01 kg of CMC is added on the basis of example 1, i.e. a combination of 0.01 kg of CMC and 0.85 kg of citric fiber replaces 0.85 kg of citric fiber.

The Brix value of the syrup mixture is determined as described in example 1. The water activity of the syrup binder system of the product obtained is determined using an Aqualab water activity meter according to the manufacturer's instructions. The data are as shown in the table below.

Then, in accordance with the operations in example 5, the syrup binder system used in example 5 is replaced with the 8 syrup binder systems mentioned above, and no chocolate coating operation is performed; 8 types of compound sachima are thereby prepared and obtained. The water activity of the compound sachima is determined using an Aqualab water activity meter according to the manufacturer's instructions, and the moisture content of the compound sachima is determined using a Mettler fast moisture content tester according to the manufacturer's instructions; the data is as shown in the table below.

| Formula | Brix value of syrup mixture | Aw of syrup binder system | Aw of compound sachima | Moisture content of compound sachima |
|---|---|---|---|---|
| Mil2 | 80% | 0.601 | 0.5744 | 7.53% |
| Mil3 | 85% | 0.5509 | 0.5097 | 4.81% |
| PF1 | 84% | 0.605 | 0.5199 | 8.04% |
| CFa1 | 84% | — | 0.4876 | 6.26% |
| CFb1 | 84% | 0.5921 | 0.4437 | 6.79% |
| CFc1 | 84% | 0.5721 | 0.4813 | 6.60% |
| CFd1 | 84% | 0.5557 | 0.4578 | 6.06% |
| CFe1 | 84% | 0.5412 | 0.4266 | 5.42% |

The abovementioned compound sachima is packaged using a high-barrier aluminium film bag, and placed in a constant-temperature, constant-humidity cabinet at 37° C. and 75% relative humidity to undergo an accelerated shelf-life test. Samples are taken at the 4th week, the 6th week, the $9^{th}$ week and the $12^{th}$ week, and the texture properties of the sachima are scored. The scoring levels are as follows: 0=no moisture absorption; 1=a small amount of moisture absorption (slightly perceptible); 3=obvious moisture absorption (a difference is perceived at the first mouthful); 5=extreme moisture absorption (obvious moisture absorption is felt). A score of less than 2.5 indicates that the texture properties of the sachima are acceptable, and no obvious dampened texture develops. FIG. 1 shows average scoring results for three samples of each type.

The results show that the product of formula Mil2 exhibits a very obvious increase in moisture absorption at the $6^{th}$, $9^{th}$ and $12^{th}$ weeks, and the scores for dampened texture are all significantly higher than 2.5; the product of formula Mil3 exhibits very little moisture absorption throughout the test period, but the product exhibits a very hard and dry texture; the product of formula PF1 exhibits a dampened texture with a score significantly higher than 2.5 at the $4^{th}$ week, and progressively worsens; the products of formulas CFa1, CFb1 and CFc1 exhibit similar product textures, and although a slight increase in moisture absorption is exhibited at the $6^{th}$, $9^{th}$ and $12^{th}$ weeks, the moisture absorption scores are always close to 2.5; the product of formula CFd1 exhibits a dampened texture throughout the test period, and the moisture absorption clearly increases as time passes; the product of formula CFe1 only exhibits a slight increase in moisture absorption at the $4^{th}$, $6^{th}$, $9^{th}$ and $12^{th}$ weeks, and exhibits a good texture.

It can be seen from an analysis of the data that in the case of a syrup binder system and a compound sachima with obviously high water activity, a product thereof clearly develops a dampened texture in the course of the test. Moreover, as can be seen, the formulas CFa1, CFb1, CFc1 and CFe1 of the present invention can all reduce or prevent the migration of moisture in the product from the binder to the bound foodstuff, especially extruded or puffed cereal; in particular, when CMC is used in combination, a better effect is exhibited in terms of reducing or preventing the migration of moisture. This enables the final food to have a longer shelf-life, and keep its good texture and taste.

It will be obvious to those skilled in the art that various amendments and adaptations may be made to the present invention without departing from the aim and scope of the present invention. Thus, these amendments and adaptations similarly fall within the scope defined by the claims attached to the present application.

The invention claimed is:

1. A syrup binder system for food, the binder system comprises a sugar, a polyol, dietary citric fiber having a water holding capacity greater than 8 ml/g, an emulsifier, edible oil, and water and wherein the syrup binder system has a viscosity of 1050-1550 CP at about 85° C.

2. The syrup binder system according to claim 1, further comprising cellulose or a derivative thereof.

3. The syrup binder system according to claim 1, wherein the polyol is a polyol having 2-5 hydroxy groups.

4. The syrup binder system according to claim 1, wherein the dietary citric fiber is present in an amount of 0.1-8 wt % based on the total weight of the syrup binder system.

5. The syrup binder system according to claim 1, wherein the emulsifier is present in an amount of 0.01-5 wt % based on the total weight of the syrup binder system.

6. The syrup binder system according to claim 1, further comprising one or more of any other substances selected from the group consisting of pigments, edible salts, preservatives, antioxidants, vitamins, minerals, trace elements and nutriments.

7. The syrup binder system according to claim 1, having a water activity ranging from 0.3 to 0.7.

8. The syrup binder system according to claim 1, consisting of the sugar, the polyol, the dietary citric fiber, the emulsifier, the edible oil, the water, and optionally at least one other substance selected from the group consisting of flavoring substances, pigments, edible salts, preservatives, antioxidants, vitamins, minerals, trace elements and nutriments.

9. The syrup binder system according to claim 1, having a water activity from 0.4 to 0.6.

10. The syrup binder system according to claim 2, consisting of the sugar, the polyol, the dietary citric fiber, the emulsifier, the edible oil, the water, the cellulose or derivative thereof, and optionally at least one other substance selected from the group consisting of flavoring substances, pigments, edible salts, preservatives, antioxidants, vitamins, minerals, trace elements and nutriments.

11. The syrup binder system according to claim 2, wherein the cellulose comprises carboxymethylcellulose (CMC) or derivative thereof.

12. The syrup binder system according to claim 11, wherein the carboxymethylcellulose (CMC) or derivative thereof is present in an amount of 0.002 to 2 wt % based on the total weight of the syrup binder system.

13. The syrup binder system according to claim 1, wherein the emulsifier comprises sucrose fatty acid ester.

* * * * *